United States Patent [19]
Kagawa et al.

[11] 3,841,912
[45] Oct. 15, 1974

[54] SODIUM SULFUR STORAGE BATTERY

[75] Inventors: Hiroshi Kagawa; Keiji Senoo, both of Osaka, Japan

[73] Assignee: Yuasa Battery Company Limited, Osaka, Japan

[22] Filed: Apr. 2, 1973

[21] Appl. No.: 346,805

[30] Foreign Application Priority Data
Sept. 9, 1972  Japan................................ 47-90726
Sept. 9, 1972  Japan................................ 47-90727

[52] U.S. Cl.................. 136/6 FS, 136/20, 136/83 T
[51] Int. Cl. .......................................... H01m 43/00
[58] Field of Search......... 136/6 FS, 6 F, 6 R, 83 R, 136/100 R, 20, 153, 86 R, 3, 161, 167, 133

[56] References Cited
UNITED STATES PATENTS

| | | | |
|---|---|---|---|
| 3,404,035 | 10/1968 | Kummer et al..................... | 136/6 FS |
| 3,413,150 | 11/1968 | Kummer et al..................... | 136/6 FS |
| 3,424,622 | 1/1969 | Dechert.............................. | 136/161 |
| 3,679,480 | 7/1972 | Brown et al....................... | 136/6 FS |
| 3,756,856 | 9/1973 | Tennenhouse.................... | 136/6 FS |
| 3,758,337 | 9/1973 | Fally et al.......................... | 136/6 FS |
| 3,770,502 | 11/1973 | Nakabayashi..................... | 136/6 FS |

*Primary Examiner*—Anthony Skapars
*Attorney, Agent, or Firm*—Watson, Cole, Grindle & Watson

[57] ABSTRACT

This invention relates to a novel sodium sulfur storage battery.

It is formed of a solid electrolyte having sulfur or sodium polysulfide a cathodic reactant as arranged outside and containing sodium as an anodic reactant within, a sodium reservoir made of a metal, jointed with said solid electrolyte and having an insulating layer on the surface and a sealed cell case containing them, the level of the above mentioned sulfur or sodium polysulfide as melted being so made as to be positioned always above the jointing part of the solid electrolyte and sodium reservoir made of a metal irrespective of the charged or discharged state. The present invention has advantages of improving the battery performance and obtaining a sodium sulfur storage battery of a long life.

3 Claims, 4 Drawing Figures

SODIUM SULFUR STORAGE BATTERY

BACKGROUND OF THE INVENTION

This invention relates to storage batteries and more particularly to a novel sodium sulfur storage battery.

A well known conventional sodium sulfur storage battery is formed mostly of a solid electrolyte made of a $\beta$—$Al_2O_3$ material and isolating sulfur or sodium polysulfide as a cathodic reactant and sodium as an anodic reactant contained in a cell from each other, a sodium reservoir made of an $\alpha$—$Al_2O_3$ material and jointed with said solid electrolyte and a cell case containing them.

In a battery of this kind, the above mentioned sulfur or sodium polysulfide is used in a molten state at a high temperature but there have been defects that, due to the stresses by the melting and coagulation of the sulfur or sodium polysulfide, the above mentioned solid electrolyte made of a ceramic material and sodium reservoir will break near their jointing part particularly on the level of the sulfur or sodium polysulfide and that, as a result, the battery life is shortened and the battery performance is remarkably reduced. The present invention is to eliminate all these defects.

SUMMARY OF THE INVENTION

A first object of the present invention is to provide a sodium sulfur storage battery having a favorable performance.

A second object of the present invention is to provide a sodium sulfur storage battery of a long life.

A third object of the present invention is to provide a simple cheap sodium sulfur storage battery which is easy to make.

These objects of the present invention can be easily understood by referring to the following description and accompanying drawings.

The present invention shall be explained in detail in the following with reference to the drawings.

DESCRIPTION OF THE PREFERRED EMBODIMENTS

Figure 1:
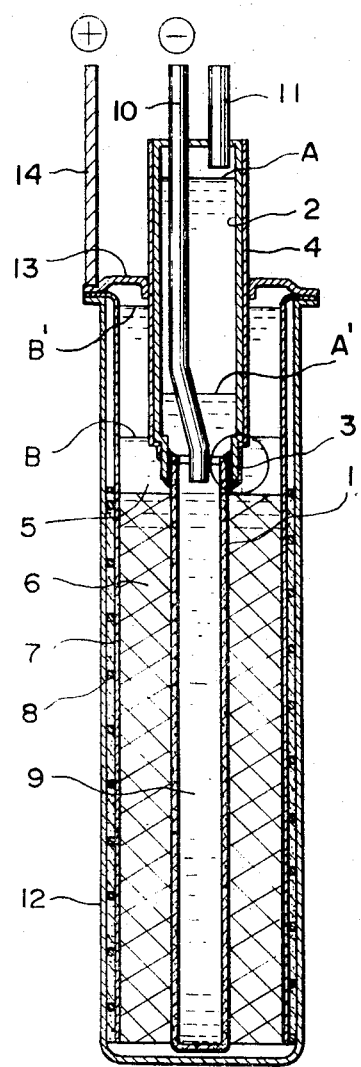
FIG. 1 is a vertically sectioned view of a storage battery showing an embodiment of the present invention.

In FIG. 1, member 1 is a solid electrolyte cylindrically formed of a $\beta$—$Al_2O_3$ material and having a bottom and being nonporous so as to pass only sodium ions thereby isolating an anode and cathode from each other. Element 2 is a sodium reservoir made of such a metal as, for example, an Fe-Ni alloy, Fe-Ni-Co alloy or Fe-Ni-Cr alloy which is a preferable material. The solid electrolyte 1 and sodium reservoir 2 are strongly jointed with each other with a glass solder 3. In the jointing process, for example, a powder of 52% $SiO_2$, 30% $B_2O_3$, 13% $Na_2O$, 3% $Al_2O_3$ and 2% CoO is applied to the jointing surfaces of the solid electrolyte and sodium reservoir, which is made of a metal, the temperature is gradually elevated to melt the glass solder and the molten solder is kept at 850°C. for several minutes and is then gradually cooled. The thus obtained joint is strong.

Figure 2:
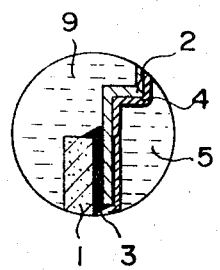
FIG. 2 is a magnified view of the jointing part of the solid electrolyte and reservoir made of a metal as in FIG. 1.

FIG. 2 shows the above mentioned jointing part in a magnified view. An insulating layer 4 is formed on the surface of the sodium reservoir 2 made of a metal. The insulating layer is preferably a film of molybdenum glass. Such special ceramic material as, for example, an $\alpha$—$Al_2O_3$ material has been already used to make a sodium reservoir insulative. While it is a favorable material in the case of jointing the sodium reservoir with the solid electrolyte with a glass solder, it is so short of the mechanical strength that it will often break while it is used as a battery forming material. This is a fatal defect. An important feature of the present invention is to use a sodium reservoir made of a metal and having an insulating layer on the surface instead of the conventional sodium reservoir made of an $\alpha$—$Al_2O_3$ material, because, according to the present invention, the mechanical strength of the sodium reservoir can be increased, its weight can be reduced to be about half, its insulation can be kept perfect and the solid electrolyte 1 jointed with it can be prevented from breaking.

Element 5 is sulfur or sodium polysulfide as cathodic reactant and is used in a molten state at about 300°C. As sulfur has no electron conductivity, a graphite sheet 6 impregnated with sulfur is used. The graphite sheet 6 serves as an electro-conductive material for cathodic sulfur, and the material which is used for the sheet is a porous graphite, graphite felt or graphite cloth. The graphite sheet 6 encloses the solid electrolyte and is fastened with a stainless steel wire 8 through a stainless steel strip 7. Element 9 is sodium which acts as an anodic reactant and is used in a molten state at about 300°C. and is contained within the solid electrolyte 1. Pipe 10 is a sodium injecting pipe which is simultaneously a negative lead. Pipe 11 is an exhaust pipe. When sodium is to be injected into the sodium reservoir 2 and solid electrolyte 1 through the injecting pipe 10, if air is exhausted through the exhaust pipe 11, the injection will be easy. A casing 12 is a cell case made of a material which is resistant to sulfur or sodium polysulfide at a high temperature as, for example, stainless steel. The upper end of the above mentioned stainless steel strip 7 and a battery cap 13, which is fitted to the sodium reservoir 2, are welded together on the upper edge of the cell case 12 to provide an air-tight seal for the case. A positive lead 14 is fitted to the battery cap 13.

Now, in the sodium sulfur storage battery of the present invention, in case where the sulfur or sodium polysulfide of the cathodic reactant and the sodium of the anodic reactant remain molten at a temperature of 300°C., electromotive reactions of the following formulas will take place:

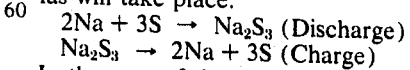

In the case of the discharge, the sodium of the anode will pass as sodium ions through the solid electrolyte to reach the cathode so that sodium polysulfide may be produced. By this reaction, the electric energy will be taken out and an energy density of about 780 WH/kg. will be obtained.

During the discharge, the level A of the sodium will be positioned at A' and the level B of the sulfur or sodium polysulfide will be positioned at B'. In the conventional storage battery, when a thermal fluctuation up and down between the battery operating temperature and the room temperature is made, particularly in case the sulfur or sodium polysulfide of the cathodic reactant makes a liquid-solid phase transition, a stress will be applied near the boundary surface of the liquid (or solid) to often break the ceramic material. In the $\beta$—$Al_2O_3$ of the solid electrolyte, its ionic conductivity occupies such large rate in the internal resistance that it is necessary to reduce the thickness, and the mechanical strength is short. The $\beta$—$Al_2O_3$ is a material so indispensable to the storage battery that no other material can be used in place of $\beta$—$Al_2O_3$. Therefore, at the time of the operation of the battery, if the levels B and B' of sulfur or sodium polysulfide are made to be positioned always in the reservoir part above the $\beta$—$Al_2O_3$ so that stresses may be concentrated in the reservoir part, even in case a liquid-solid phase transition of the sulfur or sodium polysulfide is made, no break will occur. Such a formation is another important feature of the present invention.

Figure 3:
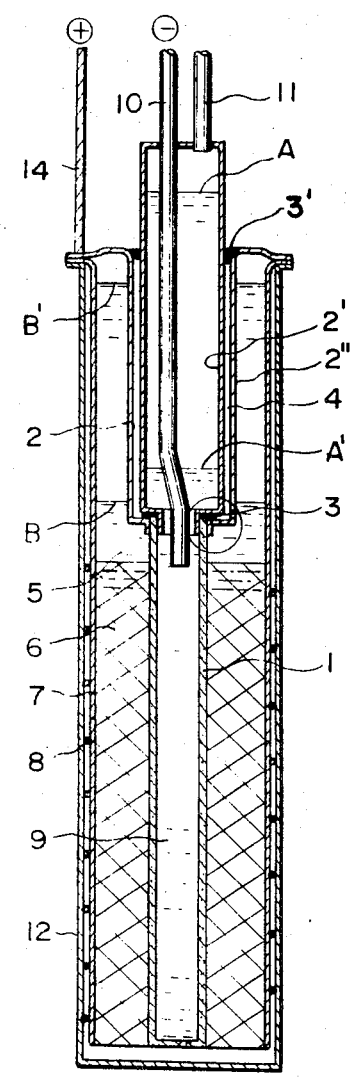
FIG. 3 is a vertically sectioned view of a storage battery showing another embodiment of the present invention.

FIG. 3 is of a sodium sulfur storage battery showing another embodiment of the present invention. As compared with the one in FIG. 1, particularly the sodium reservoir 2 made of a metal is formed of a plurality of layers. An insulating layer 4 is set in the space between the inner layer 2' and outer layer 2''. Such insulator as, for example, glass, ceramics of mica or its powder may be put into said space or an alumina or glass layer may be baked to form an insulating layer on each or either of the outside surface of the inner layer and inside surface of the outer layer. It has an advantage of holding a perfect insulating layer as compared with the one in FIG. 1.

Figure 4:
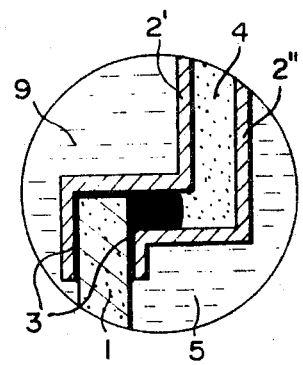
FIG. 4 is a magnified view of the jointing part of the solid electrolyte and reservoir made of a metal as in FIG. 3.

FIG. 4 shows in a magnified view a jointing part of the sodium reservoir made of a metal and the solid electrolyte in FIG. 3. Therein the solid electrolyte 1 is held at the upper end with the lower ends of the inner layer 2' and outer layer 2'' of the sodium reservoir 2 made of a metal and is jointed strongly with a glass solder 3. The upper end of the outer layer 2'' is also jointed with a glass solder 3'. The outer layer 2'' is bent outward in the upper part and is welded in the end part together with the stainless steel strip 7 and cell case 12 in the same manner as in FIG. 1. In such case, the battery cap 13 shown in FIG. 1 can be omitted. By the way, the sodium reservoir 2 made of a metal is made preferably of a metal of a thermal expansion coefficient close to that of the solid electrolyte. The inner layer 2' should be formed of an anticorroded material against sodium and the outer layer 2'' should be formed of an anticorrosion material against sulfur or sodium polysulfide. In case an anticorrosion material having a thermal expansion coefficient close to that of ceramics is not obtained, a metal of a thermal expansion coefficient close to that may be used as welded only to the part of the anticorrosion material to be in contact with the solid electrolyte. As such suitable materials, an Fe-Ni alloy may be used as welded to the inner layer 2' and an Fe-Ni-Co alloy may be used as welded to the part of the stainless steel in contact with the solid electrolyte in the outer layer 2''. Due to the above described formation, the present invention has such various advantages as are mentioned below:

1. The sodium reservoir is made of a metal having an insulating layer on the surface and is therefore so remarkably increased in the mechanical strength as compared with conventional ceramics that it will not break at all and its weight can be reduced to be half.

2. Irrespective of the charged or discharged state, the above described stresses all will be concentrated in the sodium reservoir made of a metal and will never break or crack the solid electrolyte. As a result, there can be obtained a storage battery favorable in its performance and having a long life.

3. As the sodium reservoir made of a metal is used, the battery container can be sealed with a comparatively simple electric welding. It is also possible to obtain a storage battery adapted to mass-production and low in the price.

It is obvious that various modifications are possible in a range not deviating from the spirit of the invention and that the present invention is not limited at all by the above described embodiment. For example, though a single cell has been described, it is needless to say that a sodium sulfur storage battery consisting of a plurality of cells can be obtained.

What is claimed is:

1. A sodium sulfur storage battery comprising in combination: a sealed casing; a solid electrolyte arranged within said casing; sulfur or sodium polysulfide acting as a cathodic reactant arranged outside of said solid electrolyte; sodium acting as an anodic reactant arranged within said solid electrolyte; a sodium reservoir arranged adjacent to said solid electrolyte and having a jointing surface therewith; said sulfur or sodium polysulfide being positioned adjacent to said jointing surface and having its upper level always above the jointing surface of said solid electrolyte and sodium reservoir irrespective of the charged or discharged state.

2. A battery as defined in claim 1 wherein said sodium reservoir is made of metal and has an electrically insulating layer formed of glass or ceramic on the outer surface of the metal.

3. A battery as defined in claim 1 wherein said sodium reservoir has a casing formed of a plurality of metal layers and an electrically insulating layer is arranged in the space between said metal layers.

* * * * *